Inventor
Richard J. Taylor
By Fleit, Gipple + Jacobson
Attorneys

United States Patent Office 3,705,839
Patented Dec. 12, 1972

3,705,839
AUTOMATIC SIGNAL REGISTRATION IN COLOUR TELEVISION CAMERAS
Richard John Taylor, London, England, assignor to Electric & Musical Industries Limited, Middlesex, England
Filed Dec. 8, 1970, Ser. No. 96,075
Claims priority, application Great Britain, Dec. 16, 1969, 61,127/69
Int. Cl. H04n *9/08*
U.S. Cl. 178—5.4 M 8 Claims

ABSTRACT OF THE DISCLOSURE

A colour television camera including first and second pick-up tubes is disclosed, which camera includes automatic means for ensuring registration of the video signals derived from said tubes. The video signals derived from said tubes and relating respectively to different spectral components of a scene to be televised are passed through respective outline generator means to produce respective identification signals which are indicative of selected edges in the scene. The identification signals are applied to an error detecting circuit which is arranged to generate a correction signal dependent on the degree of misregistration between the video signals, and the correction signals are utilised, either directly or indirectly, to tend to reduce the misregistration.

This invention relates to colour television cameras of the type employing a plurality of pick-up tubes arranged to scan a scene in registration and thereby to generate video signals relating to respective spectral components of the scene.

In such cameras, although the registration of the respective video signals may be correctly set initially, during operation the respective signals tend to drift relative to one another and thus to cause misregistration.

It is an object of the present invention to provide a colour television camera including a plurality of pick-up tubes and automatic signal registration apparatus, by which means the above mentioned misregistrations can be reduced or eliminated.

According to the invention there is provided a colour television camera including first and second pick-up tubes adapted to scan a scene to be televised so as to provide respective video signals representative of different spectral components of said scene, first and second outline generator means adapted to respectively receive the video signals provided by said first and second pick-up tubes and to provide respective identification signals indicative of selected edges in said scene, an error detecting circuit for comparing said identification signals and for deriving a correction signal dependent upon the degree of misregistration between said video signals, and means for utilising said correction signal to tend to reduce said misregistration.

Figure 1:
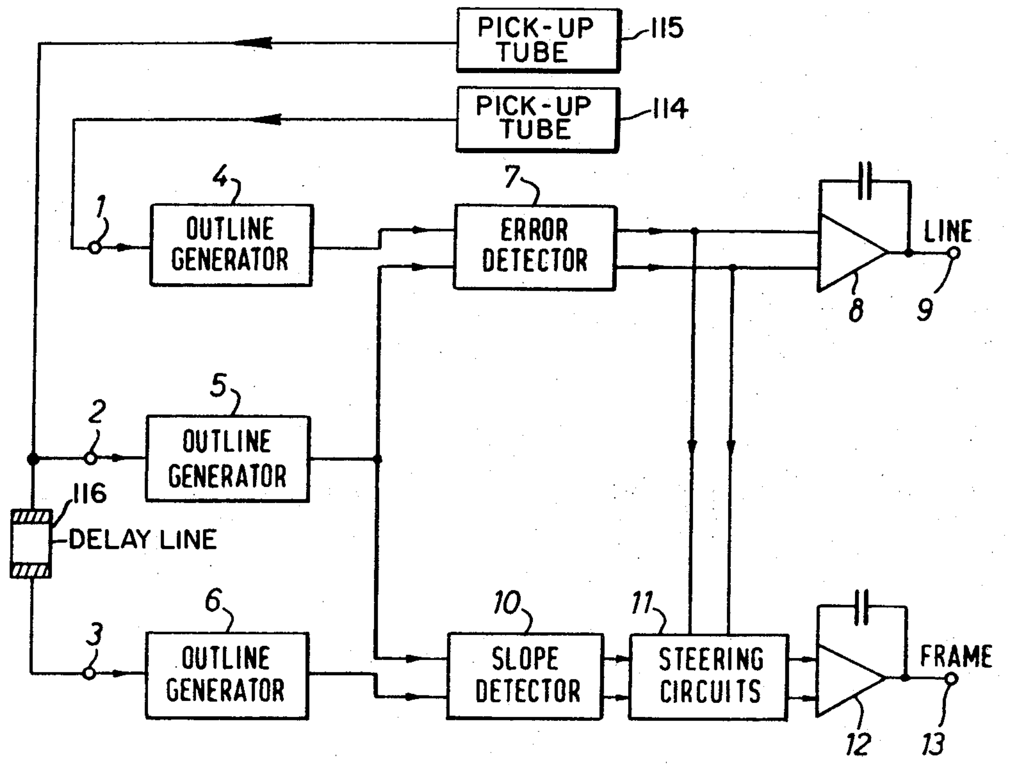
Figure 2:
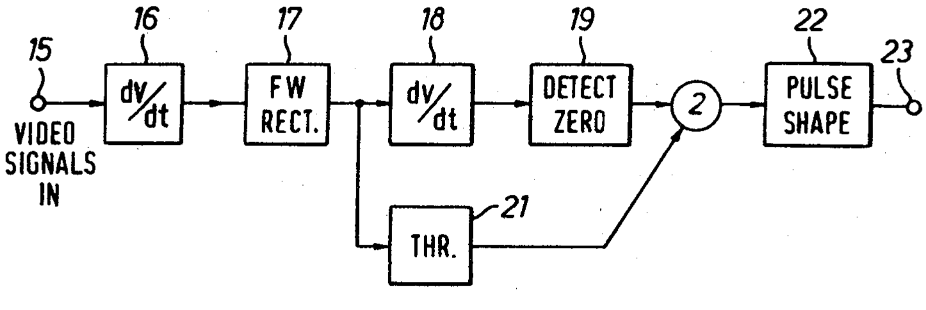
Figures 3, 5:
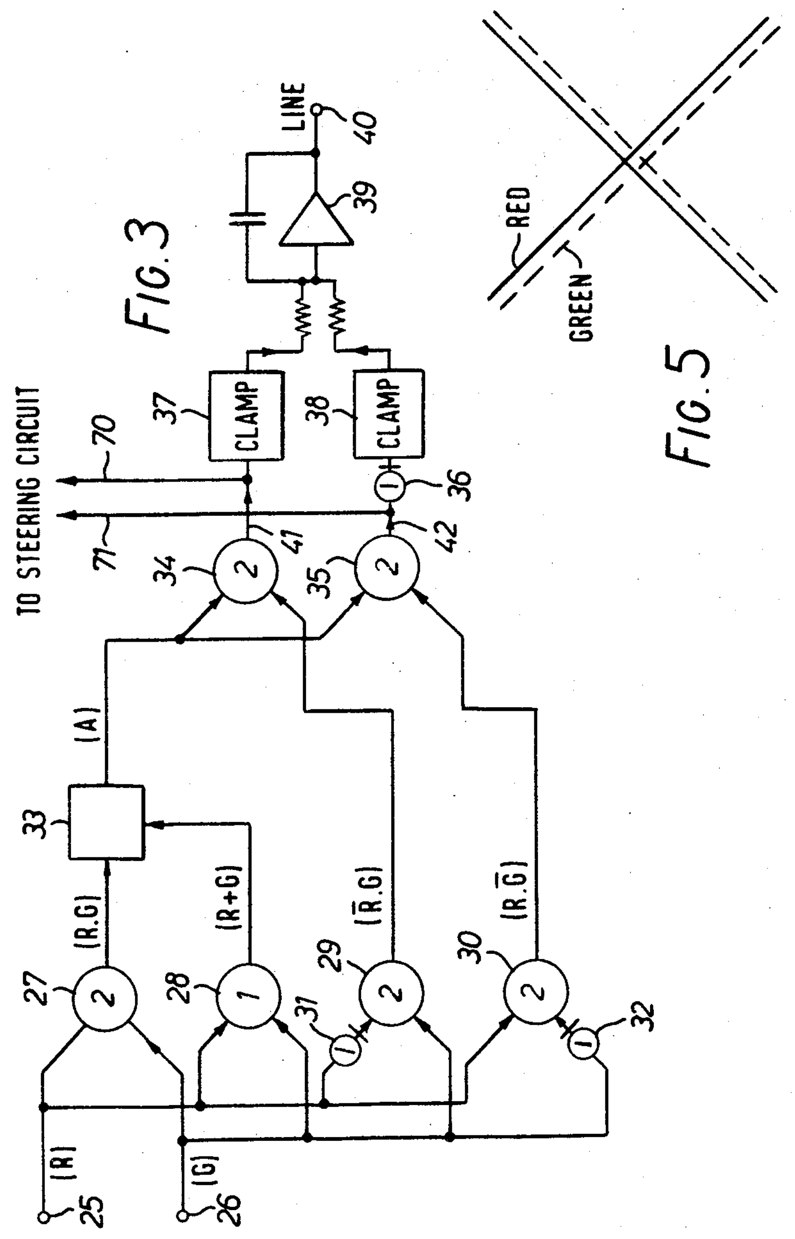
Figure 4A:
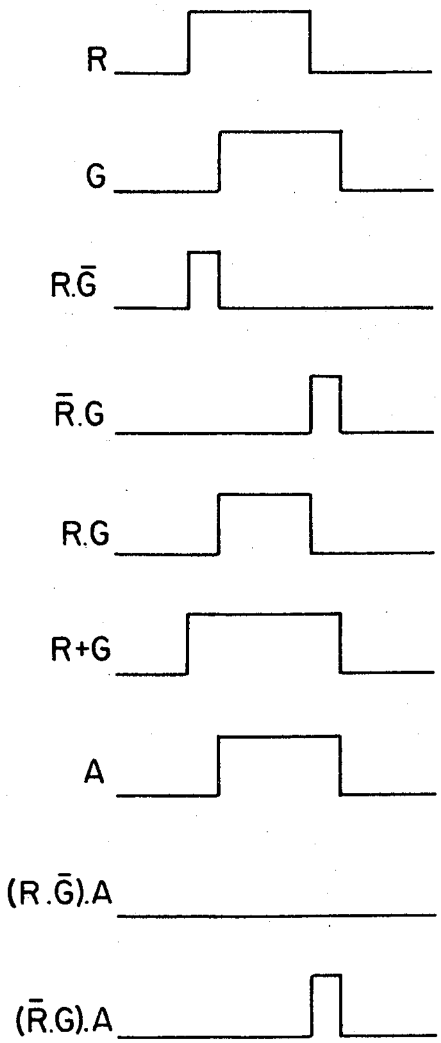
Figure 6:
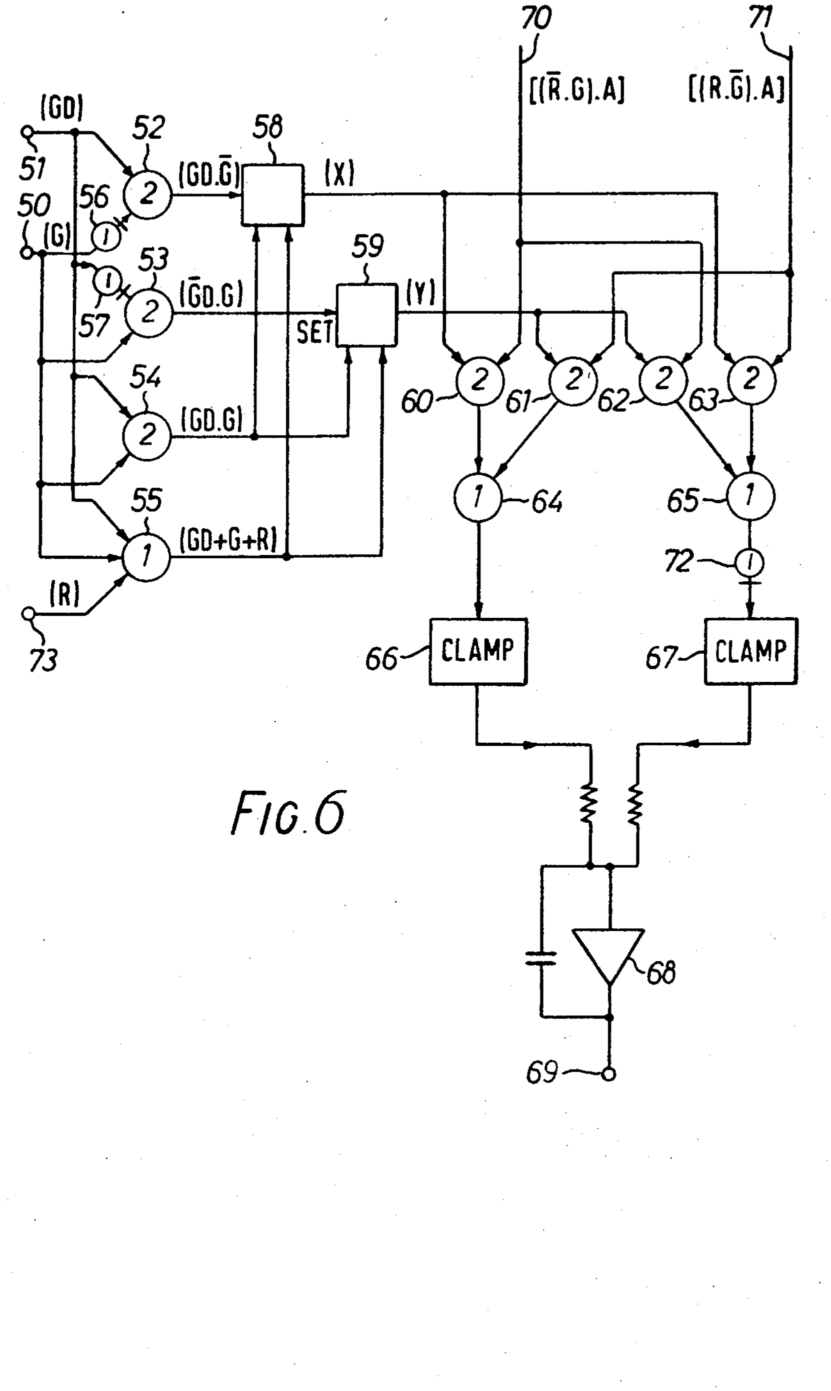
Figure 7A:
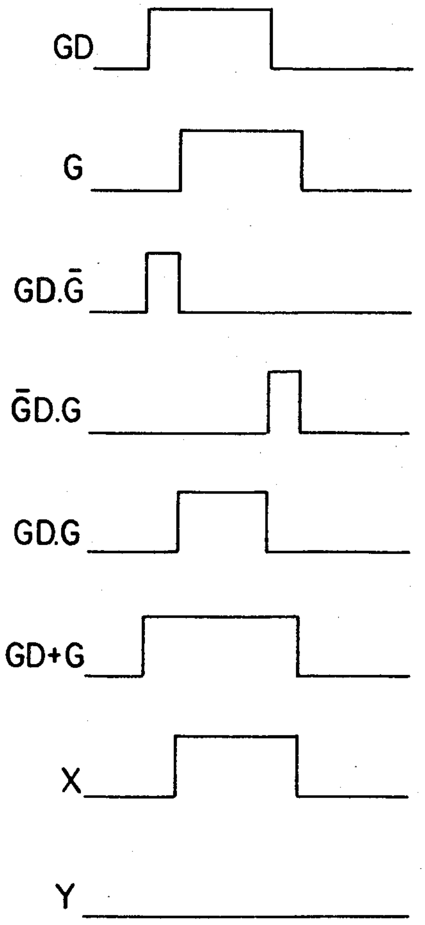
Figure 7B:
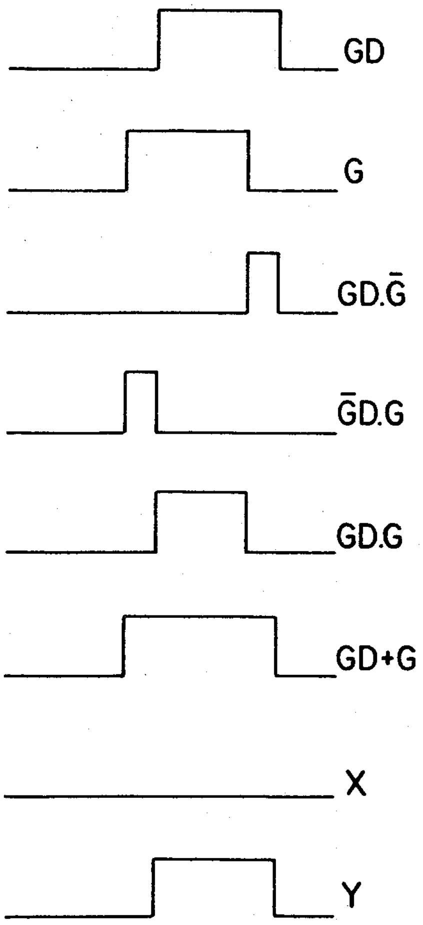
Figure 8:
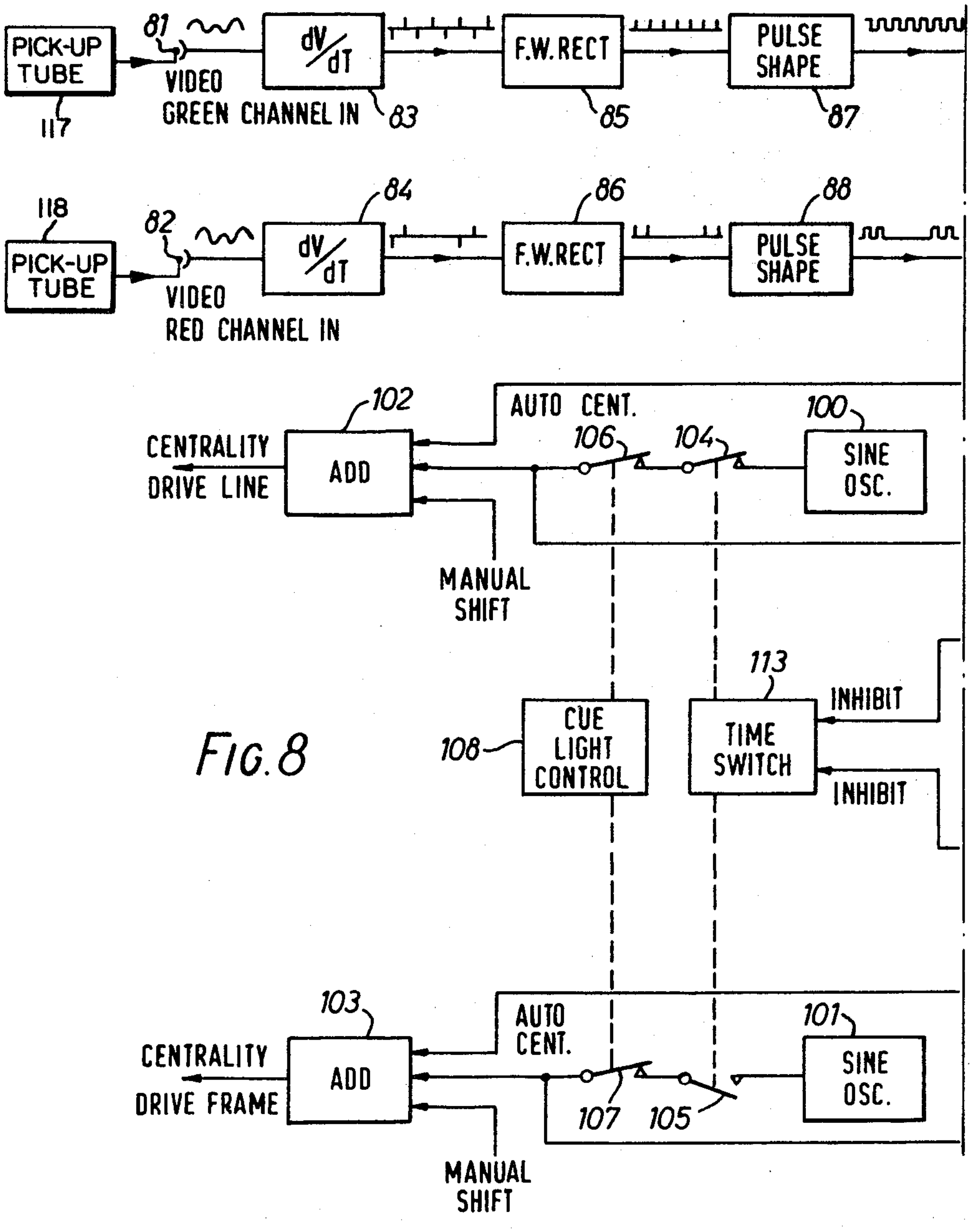
Figure 8:
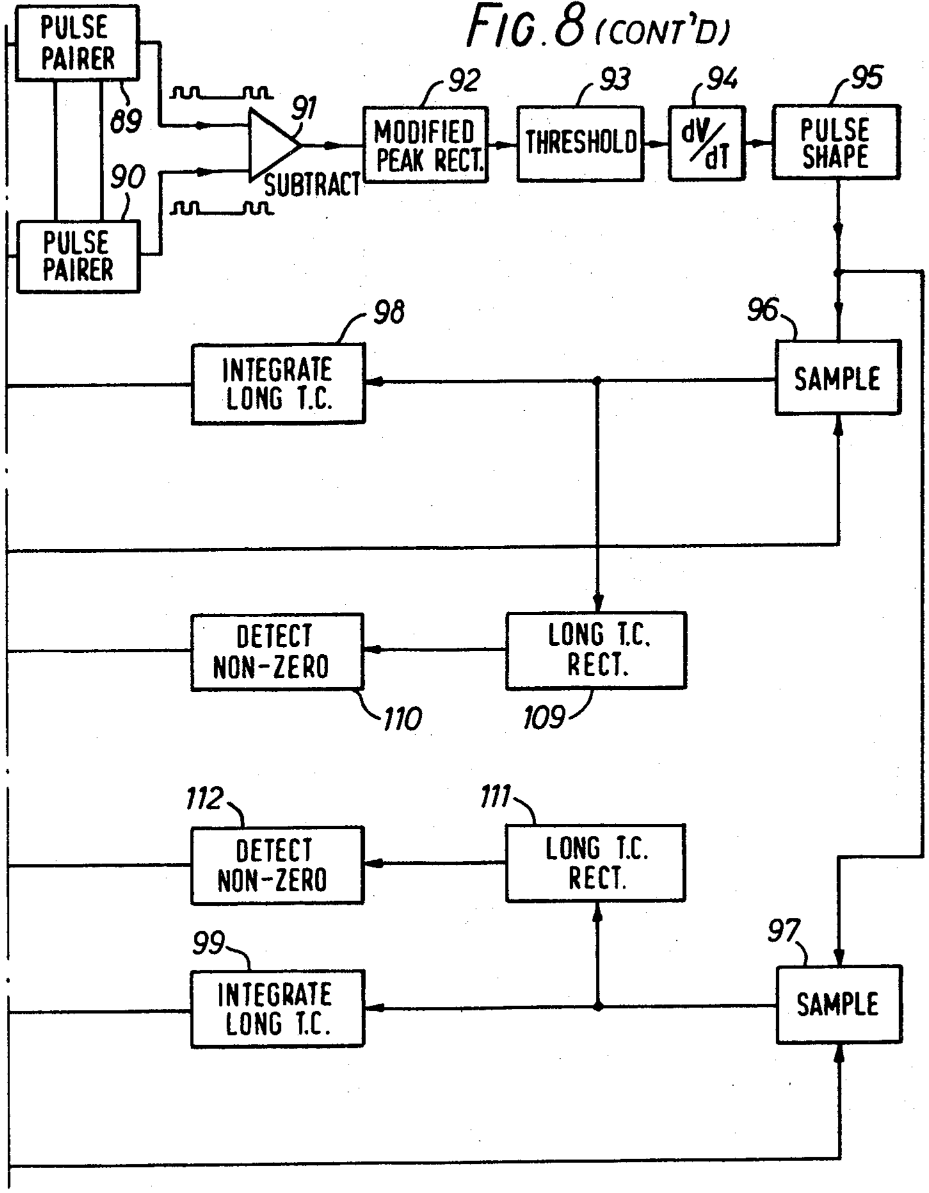

In order that the invention may be clearly understood and readily carried into effect, the same will now be described in terms of specific embodiments, with reference to the accompanying drawings in which:

FIG. 1 is a block diagram of automatic signal registration apparatus included in a colour television camera constructed according to one example of the invention, FIG. 2 shows in more detail an outline generator suitable for use with the arrangement of FIG. 1, FIG. 3 represents the line direction error detector and correction integrator portion of the circuit of FIG. 1, FIGS. 4*a* and *b* represent waveforms explanatory of the operation of the circuit of FIG. 3, FIG. 5 represents a symbol mis-registered in the frame direction, FIG. 6 represents in more detail the slope detecting, steering and frame correction circuits of FIG. 1, FIGS. 7*a* and 7*b* represents waveforms explanatory of the operation of the circuit of FIG. 6, and FIG. 8 is a block diagram of automatic signal registration apparatus included in a colour television camera according to another example of the invention.

Referring now to FIG. 1, there is shown, in block diagrammatic form, automatic registration apparatus included in a colour television camera constructed according to one example of the invention. Video signals, respectively representing, for example, the red and green colour components of a viewed scene are generated in pick-up tubes 114 and 115, and applied to terminals 1 and 2 respectively. The signals applied to one of the terminals 1 or 2 are delayed by one line period in delay line 116 and applied to terminal 3. In this example the video signals representing the green colour component of the viewed scene are delayed and applied to terminal 3. In some cameras, the required delay signals are already available from the contour correction circuits. The terminals 1, 2 and 3 are coupled respectively to outline generators 4, 5 and 6, which are used to generate signals relating to edges in the various video signals. An example of such an outline generator is shown in FIG. 2. In FIG. 2, the input terminal 15 represents one of the input terminals 1, 2 or 3 of FIG. 1. Said terminal 15 is coupled to a circuit 16 of known kind which is effective to differentiate the video signal voltage with respect to time. By this means, points of inflexion or sharp edges in the video signal are represented by a maximum value. The output of circuit 16 is full wave rectified in circuit 17 and is then applied to circuit 18, which effects a second differentiation with respect to time and therefore represents the points of inflexion by zero crossings. The zero crossings are detected by circuit 19 and applied to an "AND" gate 20 which is enabled only when the signal at the output of rectifying circuit 17 is in excess of a threshold level. This expedient prevents the circuit being operated when the video signal is small. Signals passed via gate 20 are applied to a pulse shaping circuit 22 and thence to output terminal 23.

In the present example, video signals representing the red and green components of the viewed scene are applied to terminals 1 and 2 respectively and the signals applied to terminal 2 are delayed by one camera line period and applied to terminal 3. In the following description, therefore, the symbols R, G and $G_D$ will be used to represent the waveforms present at the outputs of outline generators 4, 5 and 6 respectively.

As a non-preferred alternative arrangement, the first derivative only of the video signal with respect to time may be employed in the outline generator, signals above a fixed threshold then being employed to trigger circuit 22.

Figure 4B:
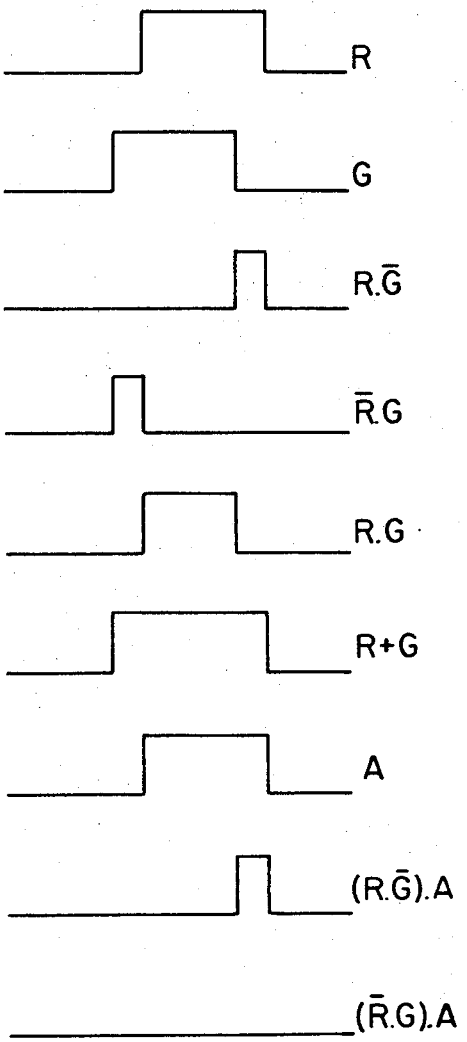

Referring again to FIG. 1, the outputs of outline generators 4 and 5 are applied to respective inputs of error detector circuit 7 and thence via a correction signal integrator 8 to the line correction output terminal 9. Circuits 7 and 8 are shown in more detail in FIG. 3, wherein input terminals 25 and 26 represent the output terminals of outline generators 4 and 5 respectively. Signals such as those indicated by waveforms R in FIGS. 4*a* and 4*b* are applied to terminal 25 and applied in parallel to "AND" gates 27 and 30 and to "OR" gate 28 and, after inversion by circuit 31, to "AND" gate 29. Signals such as those indicated by waveforms G in FIGS. 4*a* and 4*b* are applied to terminal 26 and applied in parallel to "AND" gates 27 and 29 and "OR" gate 28 and, after inversion by circuit 32, to "AND" gate 30. The signals derived from these gates are identified in FIGS. 4a and 4b by the Boolean algebraic logical function used to produce the signal e.g. the signal $R.G$ is derived from the "AND" gate 27. The $R.G$ signal from gate 27 is employed to set a flip-flop circuit 33, and the $R+G$ signal from gate 28 is employed to reset the circuit, the output signal from circuit 33 being indicated at A in FIGS. 4a and 4b. Signal A is applied in parallel to two "AND" gates, 34 and 35, to the former of which is also applied to the signal $\overline{R}.G$ and to the latter of which is applied the signal $R.\overline{G}$. The output of gate 35, that is the signal $(R.\overline{G}).A$, is inverted in circuit 36 and applied to clamping circuit 38, and the output of gate 34, that is the signal $(R.\overline{G}).A$, is applied to clamping circuit 37. Thus outputs on two lines 41 and 42 are obtained, pulses appearing one one line for shifts of the red video signal to the left of the green video signal and on the other line when the red video signal is shifted to the right of the green video signal, the waveforms in FIG. 4a corresponding to the former case and the waveforms of FIG. 4b corresponding to the latter case.

The outputs on lines 41 and 42 are integrated in circuit 39 and the line correction signal appears at output terminal 40. The output signals from gates 34 and 35 are also applied, via conductors 70 and 71 respectively, as correcting signals for the frame direction, but in order to achieve such correction, the slope detector and steering circuits 10 and 11 of FIG. 1 are required. The reason for this is shown with reference to FIG. 5, which shows a cross, malregistered in the frame direction. This malregistration of the signal can be monitored from information derived from the line direction only provided that the direction of slope of the lines forming the symbol can be sensed. For lines sloping upwards to the left and showing a line shift on the red channel to the right of the green, the resultant frame error is upwards, but for lines sloping upwards to the right, an upwards frame error gives rise to a line shift on the red channel to the left of the green. Thus it is necessary to steer the error pulses derived from scanning in the line direction to a frame error integrator circuit in dependence upon the direction of slope of the line from which they were derived.

FIG. 6 shows in more detail the slope detector and steering circuits of the FIG. 1 arrangement. Terminals 50 and 51 represent the output terminals of circuits 5 and 6 of FIG. 1 respectively. Signals G applied to terminal 50 are applied in parallel to gates 53, 54 and 55 and, after inversion in circuit 56, to gate 52. Signals $G_D$ applied to terminal 51 are applied in parallel to gates 52, 54 and 55 and, after inversion in circuit 57, to gate 53. Gates 52, 53 and 54 are "AND" gates and produce at their outputs signals $G_D.\overline{G}$, $\overline{G}_D.G$ and $G_D.G$ respectively and these signals are indicated by the waveforms of FIGS. 7a and 7b. At the output of "OR" gate 55 is produced the signal $G_D+G$. Signal $G_D.\overline{G}$ is used to set a multistate flip-flop circuit 58, the circuit being fired by the signal $G_D.G$ and reset by the rear end of the $G_D+G+R$ signal, the signal R being derived from terminal 73 which represents the output of circuit 4. The multi-state flip-flop circuit 59 operates similarly to circuit 58, except that it is set by the singal $\overline{G}_D.G$. The signals X and Y are thus obtained at the outputs of circuits 58 and 59 respectively. The signals X and Y are used to steer the correcting signals on conductors 70, 71 to the correct input line to integrator 69 in dependence upon the direction of slope of the line which has been detected. If the line slopes upwards to the left, corresponding to the situation in which $G_D$ occurs before G, then signal X enables "AND" gates 60 and 63 whilst signal Y is zero. Thus an output on conductor 70 is applied via buffer gate 64 to clamping circuit 66 and thence to integrator 68. Similarly any output on conductor 71 is applied to the integrator via gate 65, inverting circuit 72 and clamp 67. If, however the line slopes upwards to the right, then signal Y enables "AND" gates 61 and 62, so that an output on conductor 70 is applied to the integrator via gate 65, inverting circuit 72 and clamp 67 whereas an output conductor 71 is applied to the integrator via gate 64 and clamp 66. The frame correcting function appears at terminal 69.

The waveforms shown in FIGS. 7a and 7b can appear at the positions in FIG. 6 shown by the bracketed Boolean functions. For simplicity, the R component is omitted from the $(G_D+G)$ signal in FIGS. 7a and 7b, since the R signal may assume a number of positions with respect to the G signal and it is impractical to show one such position in FIGS. 7a and 7b. It will be understood that the effect of supplementing the signal $(G_D+G)$ by the R signal is to ensure that at all times the steering signals X and Y enable the respective gates 60 to 63 for a sufficient time to permit the error signals on conductors 70 and 71 to be passed to integrator 68.

The output terminals 9 and 13 of FIG. 1, corresponding respectively to terminal 40 in FIG. 3 and to terminal 69 in FIG. 6, may be coupled via respective adding circuits to the line and frame shift circuits which may also be supplied with inputs from respective manual setting means to enable the initial registration to be set up manually.

The means for deriving signals representing the logical functions described herein are described by way of example only and alternative arrangements will be evident to those skilled in the art. Moreover, the error and slope detectors, 7 and 10 respectively in FIG. 1, may be replaced by a bank of four "AND" gates and three similar analogue delay circuits arranged as follows. The R signal is applied directly to a first of said gates and, after passage through a first of said delay circuits to a second of said gates. The G signal is applied directly to said second gate and to a third of said gates and, after delay in a second of said delay circuits to said first gate and a fourth of said gates. The $G_D$ signal is applied directly to said fourth gate and, after delay in the third of said delay circuits, to said third gate. The said delay circuits are arranged to have delays equal to or somewhat less than the pulse width of signal A (FIGS. 4(a) and 4(b)) and thus the error signals are produced at the outputs of said first and second gates respectively, the steering signals are produced at the outputs of said first and second gates respectively and the steering signals are produced at the outputs of said third and fourth gates respectively. These signals are then applied to gates 60–63 as shown in FIG. 6.

A non-preferred alternative embodiment of the invention will now be described with reference to FIG. 8.

Trains of video signals relating, for example, to the green and red components of a scanned scene are derived from respective pick-up tubes 117 and 118, and applied to terminals 81 and 82 respectively. The green and red channel video signals are differentiated in circuits 83 and 84 respectively so as to indicate edges in the scene. The trains of pulses output from circuits 83 and 84 are applied to full wave rectifier circuits 85 and 86 respectively and thence to pulse shaping circuits 87 and 88 respectively. Circuits 89 and 90 are employed to pair off pulses of the trains applied to them from circuits 87 and 88 respectively so that only pulses which are present substantially simultaneously at the output of circuits 87 and 88 are applied to the two inputs of a subtracting circuit 91. This prevents the circuits attempting to operate on pulses, for example in the green channel, which have no counterpart in the red channel. The output of circuit 91 is peak rectified in circuit 92, which produces a zero output when the two signal trains are in perfect registration, since the edges recorded in both the red and green channels coincide.

A sinusoidal oscillation is generated by means of oscillator 100 and, for horizontal registration, is applied as a perturbation to the line drive circuits of the pick-up tube coupled to the red channel, and also to an input of a sampling circuit 96. The two trains of pulses in the red and green channels periodically pass through perfect registration as the red signals move in accordance with the applied sinusoidal perturbation relative to the green signals and the output signals from circuit 92, after thresholding in circuit 93, differentiation in circuit 94 and shaping in circuit 95 are applied to the control input of sampling circuit 96. The arrangement is such that the sinusoidal oscillation applied to circuit 96 is sampled each time the two trains of signals pass through perfect registration, that is each time the output signal from circuit 92 falls below the threshold set by circuit 93. The output signals from circuit 96, comprising the sampled portions of the oscillations are applied to an integrating circuit 98 and thence, as a correction signal, to the line drive circuit via adder 102.

For vertical, or frame registration, the above steps are repeated by means of oscillator 101, sampling circuit 97, integrator circuit 99 and adding circuit 103. It will be observed that, although perturbation in this instance is applied to the frame coils, the error information is still derived from the horizontal or line direction.

The amplitude of the sinusoidal perturbation applied to the pick-up tube 118 coupled to the red channel is made so small as to be practically invisible. Alternatively however, a larger perturbation can be applied, and rendered invisible by applying it to only one frame in *n* where *n* is an integer between 10 and 50. A further alternative arrangement is to apply said perturbation only when the camera is not being used for transmission and in this case switches 106 and 107 may be included as shown and operated under the cue light control 111 to be closed (so as to permit the passage of signals) only when the said cue light is off.

The line or horizontal register must be correct before the frame or vertical registration is perturbed and corrected, so that the circuits 109, 110 and 111, 112 respectively cooperate with time switch 113 to maintain switch 104 closed (so as to permit the passage of signals) until horizontal registration is correct and only then to close switch 105 so as to permit registration compensation to be applied in the frame or vertical direction.

The circuit as hereinbefore described may be modified to take account of amplitude differences between the video signals applied to terminals 81 and 82 respectively and correspondingly different edge slopes as between the two trains of signals by deriving the second order differential with respect to time of the respective waveforms instead of the first order differential. The circuit may then be further modified to compare the coincidence of zero crossings of the respective differentiated signals, and the registration corrected on this basis.

In a further modification of this example, which may be employed with either the circuit described with reference to FIG. 8 or the modification thereof, the amplitude of the sinusoidal oscillations may be rendered variable in the same sense as and in dependence upon the error signals derived from circuits 98 and 99 respectively.

As a still further modification of this example of the invention, which is applicable to apparatus in which either the first or the second derivatives with respect to time of the video waveforms are taken, the frequency of the oscillator 100 is chosen to be approximately ten times that of the oscillator 101. The line and frame mis-registrations may then be corrected simultaneously and the switches 113, 104 and 105 and their associated operating circuits can be dispensed with.

Although the invention has been described in terms of correcting the registration between the red and green colour channels, clearly the blue channel may be registered to either of the above channels either instead of, or as well as, the registration between the red and green channels. Moreover, in a camera employing a separate luminance channel, any or each of the colour channels may be matched to the luminance channel by means of the invention.

What I claim is:

1. A colour television camera including first and second pick-up tubes adapted to scan a scene to be televised so as to provide respective video signals representative of different spectral components of said scene, first and second outline generator means adapted to respectively receive the video signals provided by said first and second pick-up tubes and to provide respective identification signals indicative of selected edges in said scene, an error detecting circuit for comparing said identification signals and for deriving a correction signal dependent upon the degree of misregistration between said video signals, and means for utilising said correction signal to tend to reduce said misregistration.

2. A camera as claimed in claim 1 wherein the identification signals derived from said first and second outline generator means are designated R and G respectively, and said error detecting circuit includes means for deriving, from said R and G signals, four further signals indicative of the Boolean algebraic functions $R.G$; $R+G$; $\overline{R}.G$ and $R.\overline{G}$ respectively, a circuit for generating from said further signals indicative of the functions $R.G$ and $R+G$ a datum signal representing a datum function, means for comparing the remaining two of said further signals individually with said datum signal, means for providing respective output signals from said individual comparisons and means for combining said respective output signals to form said correction signal.

3. A camera as claimed in claim 2 adapted to include correction for both line and frame direction misregistrations between viedo signals, wherein the first mentioned correction signal is utilised for reducing misregistration in the line direction, and the said respective output signals are also applied, via steering circuits, to means for combining them to produce a futher correction signal, for said frame direction.

4. A camera as claimed in claim 3 wherein said steering circuits include first, second, third and fourth "AND" gates, each having two input terminals and a single output terminal, and first and second, "OR" gates, both having two input terminals and one output terminal, the gates being arranged with the output terminals of said first and second "AND" gates connected respectively to the input terminals of said first "OR" gate; with the output terminals of said third and fourth "AND" gates connected respectively to the input terminals of said second "OR" gate; with one of said respective output signals applied to one of the input terminals of each of said first and third "AND" gates; with the other of said respective output signals applied to one of the input terminals of each of said second and fourth "AND" gates, and wherein a slope detector circuit is adapted to apply a first enabling waveform to the second input terminal of each of said first and fourth "AND" gates and to apply a second enabling waveform to the second input terminal of each of said second and third "AND" gates.

5. A camera as claimed in claim 4 including a third input terminal which is adapted to receive one of said video signals delayed by one line period and third outline generator means connected to said third input terminal and adapted to derive from said delayed video signals a third identification signal designated $G_D$, and wherein said slope detector circuit comprises means for deriving, from said R, G and $G_D$ signals, four intermediate signals represented by the Boolean algebraic functions $G_D.\overline{G}$; $\overline{G}_D.G$; $G_D.G$ and $G_D+G+R$, and two multi-state flip-flop circuits for respectively combining said latter two intermediate signals with each of said first two intermediate signals to provide said first and second enabling waveforms.

6. A camera as claimed in claim 1 wherein each of said outline generator means comprises a first differentiating circuit for differentiating said video signals with respect to time, rectifier means for rectifying the differentiated signals, a second differentiating circuit for differentiating the rectified signals, a zero detecting circuit for producing an output signal when the output signal from said second differentiating circuit is substantially zero, and "AND" gate, having two input terminals and one output terminal, connected to receive said output signal at one of its input terminals, a threshold circuit connected to receive the rectified signals and to provide an enabling signal to the second input terminal of said "AND" gate when said rectified signals are in excess of the threshold, the output terminal of said "AND" gate being connected via a pulse shaping circuit to said error detecting circuit.

7. A colour television camera including first and second pick-up tubes adapted to scan a scene to be televised so as to provide respective video signals representative of different spectral components of said scene, first and second outline generator means adapted to respectively receive the video signals provided by said first and second pick-up tubes and to provide respective identification signals indicative of selected edges in said scene, an error detecting circuit for comparing said identification signals and for deriving a correction signal dependent upon the degree of misregistration between said video signals, waveform generator means for applying a first periodically varying perturbation to one of said video signals relative to the other in the line direction, means for detecting when said correction signal falls below a threshold value and for then generating a sampling signal adapted to sample the waveform causing said perturbation, means for deriving from the sampled waveform a modified correction signal, and means for utilising said modified correction signal to tend to reduce said misregistration.

8. A camera as claimed in claim 7 including further waveform generator means for applying a periodically varying perturbation in the frame direction to one of said video signals relative to the other, said sampling signal being adapted to also sample the further waveform, means for deriving from the sampled further waveform a second modified correction signal, and means for utilising said second modified correction signal to tend to reduce misregistration in the frame direction.

References Cited

UNITED STATES PATENTS

| | | | |
|---|---|---|---|
| 3,471,634 | 10/1969 | Clark et al. | 178—5.4 M |
| 2,894,058 | 7/1959 | Shapiro | 178—5.4 M |

RICHARD MURRAY, Primary Examiner